(12) United States Patent
Kamimura

(10) Patent No.: US 9,469,180 B2
(45) Date of Patent: Oct. 18, 2016

(54) VEHICULAR RESIN BACK DOOR

(71) Applicant: TOYOTA JIDOSHA KABUSHIKI KAISHA, Toyota-shi, Aichi-ken (JP)

(72) Inventor: Shinya Kamimura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/942,436

(22) Filed: Nov. 16, 2015

(65) Prior Publication Data
US 2016/0185193 A1 Jun. 30, 2016

(30) Foreign Application Priority Data

Dec. 24, 2014 (JP) ................................. 2014-260952

(51) Int. Cl.
*B60J 5/10* (2006.01)

(52) U.S. Cl.
CPC ................. *B60J 5/107* (2013.01); *B60J 5/102* (2013.01)

(58) Field of Classification Search
CPC ......... B60J 5/101; B60J 5/107; B60J 5/0481
USPC ..................................... 296/146.5, 146.8, 56
See application file for complete search history.

(56) References Cited

U.S. PATENT DOCUMENTS

| | | | | |
|---|---|---|---|---|
| 4,822,098 | A * | 4/1989 | Vogt | B60J 5/101 296/146.5 |
| 6,241,307 | B1 * | 6/2001 | Kim | B60J 5/107 296/106 |
| 7,503,619 | B2 * | 3/2009 | Werner | B60J 1/1884 296/106 |
| 7,914,066 | B2 * | 3/2011 | Miyake | B60J 5/107 296/146.6 |
| 8,690,220 | B2 * | 4/2014 | Tsukiyama | B62D 35/007 296/106 |
| 9,162,635 | B2 * | 10/2015 | Hazawa | B60R 13/04 |

FOREIGN PATENT DOCUMENTS

| | | |
|---|---|---|
| JP | 2010100227 A | 5/2010 |
| JP | 2010188792 A | 9/2010 |
| JP | 2010260519 A | 11/2010 |
| JP | 2011051544 A | 3/2011 |
| JP | 2013-233871 A | 11/2013 |
| JP | 2014-131896 A | 7/2014 |

* cited by examiner

*Primary Examiner* — Rodney Mintz
*Assistant Examiner* — Daniel Kenny
(74) *Attorney, Agent, or Firm* — Oliff PLC

(57) ABSTRACT

A vehicular resin back door includes: an inner panel made of resin, the inner panel including: a front edge portion that extends in a vehicle width direction, and right and left edge portions that extend in a vehicle body front-rear direction, the front, right and left edge portions configuring an opening. The vehicular resin back door also includes: (i) a front portion outer panel that extends in the vehicle width direction and is attached to the front edge portion to form a first chamber; (ii) right and left side portion outer panels that extend in the vehicle body front-rear direction and are respectively attached to the right and left edge portions to form second chambers; and (iii) front joint portions at which vehicle width direction outside end portions of the front portion outer panel and front end portions of the side portion outer panels overlap and are joined together.

6 Claims, 7 Drawing Sheets

VEHICULAR RESIN BACK DOOR

CROSS-REFERENCE TO RELATED APPLICATION

This application claims priority under 35 USC 119 from Japanese Patent Application No. 2014-260952 filed on Dec. 24, 2014, the disclosure of which is incorporated by reference herein in its entirety.

BACKGROUND

1. Technical Field

Preferred embodiments relate to a vehicular resin back door.

2. Related Art

Conventionally, a back door (vehicle rear hatch) comprising an upper portion, right and left side portions, and a bottom portion has been known. The upper portion is disposed such that its lengthwise direction coincides with a vehicle width direction. The right and left side portions are disposed such that their lengthwise direction coincides with a vehicle body up-down direction. The bottom portion is disposed below lower end portions of the right and left side portions. The upper portion, the right and left side portions, and the bottom portion are configured as a result of an inner panel made of resin and an outer panel made of resin being overlaid on one another in such a way that a hollow region (an internal chamber) is formed between them. A right and left pair of reinforcements made of steel plates that straddle the upper portion, the side portions, and the bottom portion are disposed in the hollow region (e.g., see Japanese Patent Application Laid-open (JP-A) No. 2010-100227).

However, the structure that improves the torsional rigidity of the corner portions between the side portions and the front portion or the bottom portion of a back door made of resin still has room for improvement.

SUMMARY

Preferred embodiments provide a vehicular resin back door in which the torsional rigidity of corner portions of the vehicular resin back door is improved.

A vehicular resin back door of a first aspect of the disclosure includes: an inner panel made of resin, the inner panel including: a front edge portion that extends in a vehicle width direction, and right and left edge portions that extend in a vehicle body front-rear direction, the front, right and left edge portions configuring an open portion (defining an opening). The vehicular resin back door also includes (i) a front portion outer panel that extends in the vehicle width direction and is attached to the front edge portion of the inner panel to form a first chamber; (ii) a right side portion outer panel and a left side portion outer panel that each extend in the vehicle body front-rear direction and are respectively attached to the right and left edge portions of the inner panel to form second chambers; and front joint portions at which vehicle width direction outside end portions of the front portion outer panel and front end portions of the side portion outer panels overlap and are joined to one another.

According to the first aspect, the vehicle width direction outside end portions of the front portion outer panel that configures a first chamber with the front edge portion of the inner panel, and the front end portions of the right and left side portion outer panels that configure second chambers respectively with the right and left edge portions of the inner panel are overlaid on (i.e., they overlap each other) and are joined to one another. In other words, the front joint portions at which the front portion outer panel and the side portion outer panels are overlaid on and joined to one another are formed at the corner portions between the front portion and the side portions. Consequently, the torsional rigidity of the corner portions on the front portion side of the vehicular resin back door is improved.

Furthermore, a vehicular resin back door of a second aspect of the disclosure includes the first aspect, wherein the vehicle width direction outside end portions of the front portion outer panel are curved toward a vehicle body rear side as seen in a plan view and are overlaid (overlap) from a vehicle body upper side, and are joined to, the front end portions of the side portion outer panels.

According to the second aspect, the vehicle width direction outside end portions of the front portion outer panel that are curved toward the vehicle body rear side as seen in a plan view are overlaid (overlap) from the vehicle body upper side, and are joined to, the front end portions of the side portion outer panels. Consequently, the waterproofness of the outer panel of the vehicular resin back door is improved.

Furthermore, a vehicular resin back door of a third aspect of the disclosure includes the second aspect, wherein end surfaces of the vehicle width direction outside end portions of the front portion outer panel lie along (extend along) the vehicle width direction.

According to the third aspect, the end surfaces of the vehicle width direction outside end portions of the front portion outer panel lie (extend) along the vehicle width direction. Consequently, the waterproofness of the outer panel of the vehicular resin back door is further improved.

Furthermore, a vehicular resin back door of a fourth aspect of the disclosure includes the first aspect, wherein the inner panel includes: a rear edge portion that extends in the vehicle width direction and configures (forms) the open portion (the opening) with the front, right and left edge portions, and a bottom portion that is integrally disposed at the vehicle body lower side of the rear edge portion. In addition, the vehicular resin back door further comprises: a rear portion outer panel that is attached to the bottom portion of the inner panel to form a third chamber, and rear joint portions at which vehicle width direction outside upper end portions of the rear portion outer panel and rear end portions of the side portion outer panels are overlaid on (overlap each other) and joined to one another at vehicle width direction outside end portions of the rear edge portion.

According to the fourth aspect, the vehicle width direction outside upper end portions of the rear portion outer panel and the rear end portions of the side portion outer panels are overlaid on (overlap) and joined to one another at the vehicle width direction outside end portions of the rear edge portion. In other words, the rear joint portions at which the side portion outer panels and the rear portion outer panel are overlaid on (overlap) and joined to one another are formed at the corner portions between the side portions and the rear portion. Consequently, the torsional rigidity of the corner portions on the rear portion side of the vehicular resin back door is improved.

Furthermore, a vehicular resin back door of a fifth aspect of the disclosure includes the fourth aspect, wherein the rear end portions of the side portion outer panels are overlaid (overlap) from the vehicle body upper side, and are joined to, the vehicle width direction outside upper end portions of the rear portion outer panel.

According to the fifth aspect, the rear end portions of the side portion outer panels are overlaid (overlap) from the vehicle body upper side, and are joined to, the vehicle width direction outside upper end portions of the rear portion outer panel. Consequently, the waterproofness of the outer panel of the vehicular resin back door is improved.

Furthermore, a vehicular resin back door of a sixth aspect of the disclosure includes the fifth aspect, wherein end surfaces of the rear end portions of the side portion outer panels lie (extend) along the vehicle width direction.

According to the sixth aspect, the end surfaces of the rear end portions of the side portion outer panels lie (extend) along the vehicle width direction. Consequently, the waterproofness of the outer panel of the vehicular resin back door is further improved.

BRIEF DESCRIPTION OF THE DRAWINGS

An exemplary embodiment will be described in detail based on the following figures, wherein.

DETAILED DESCRIPTION

Figure 1:
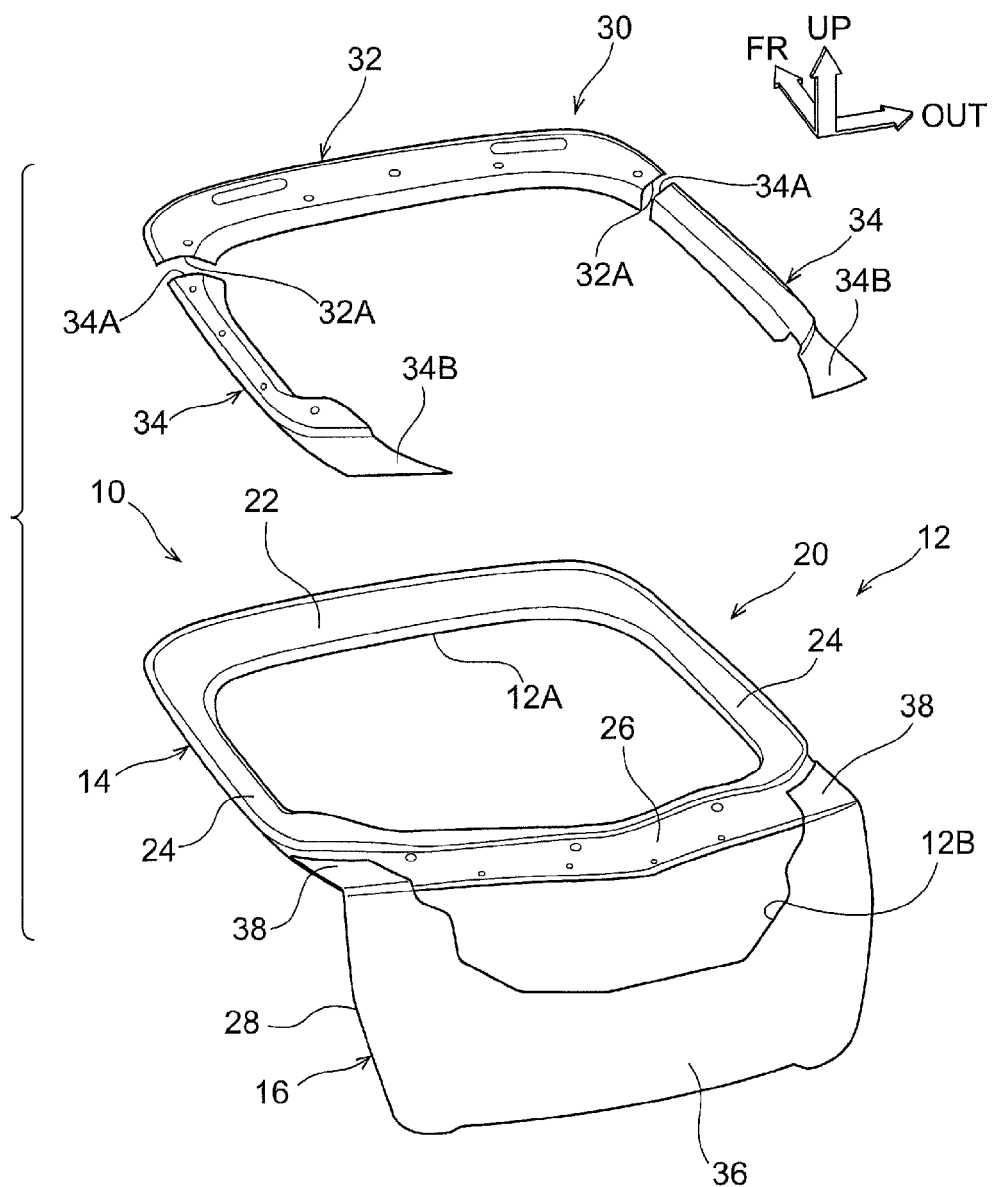
FIG. 1 is a partial exploded perspective view of a back door panel that configures a vehicular resin back door pertaining to one embodiment.

A preferred embodiment will be described in detail below on the basis of the drawings. It should be noted that, for convenience of description, arrow UP appropriately shown in the drawings indicates a vehicle body upward direction, arrow FR indicates a vehicle body frontward direction, and arrow OUT indicates an outward direction in a vehicle width direction. Furthermore, when the directions of up and down, front and rear, and right and left are used without further specification in the following description, these will be understood to mean up and down in a vehicle body up-down direction, front and rear in a vehicle body front-rear direction, and right and left in a vehicle body right and left direction (vehicle width direction).

Figure 2:
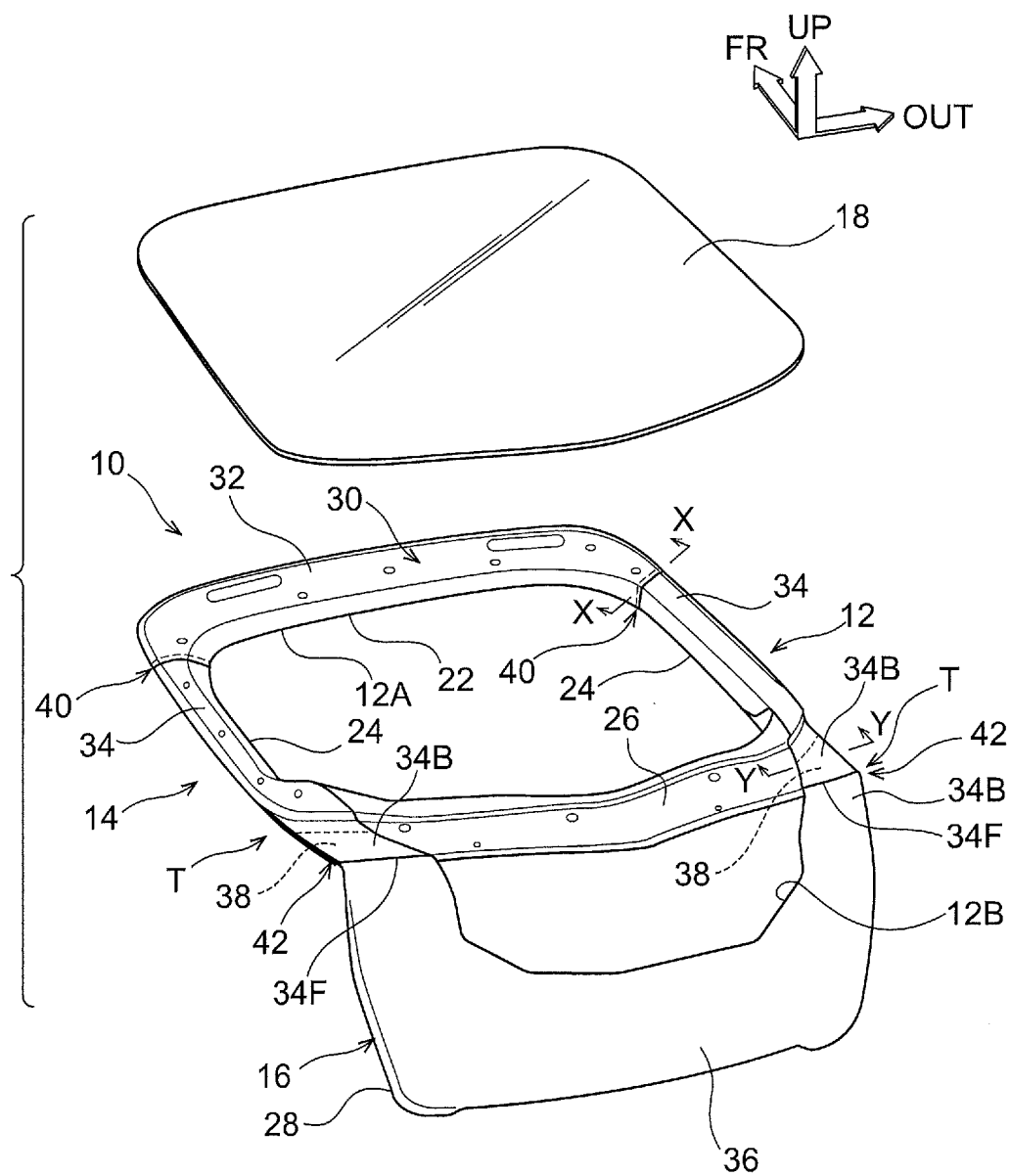
FIG. 2 is a perspective view showing the back door panel and a back window upper glass that configure the vehicular resin back door pertaining to the FIG. 1 embodiment.

As shown in FIG. 1 and FIG. 2, a resin back door 10 disposed at a rear portion of a vehicle body not shown in the drawings is configured to include a back door panel 12, a back window upper glass 18 that is disposed in such a way as to close an open portion (opening) 12A formed at an upper portion (front portion) of the back door panel 12, and a back window lower glass (not shown in the drawings) that is disposed in such a way as to close an open portion (opening) 12B formed at a lower portion (rear portion) of the back door panel 12.

It should be noted that the back door panel 12 is bent in a substantial inverted "L" shape as seen in a side view seen from the vehicle width direction. That is, the back door panel 12 has a lower panel 16 disposed along the vehicle body up-down direction and an upper panel 14 disposed along the vehicle body frontward and upward direction (vehicle body front-rear direction) from the upper end portion of the lower panel 16 in a state in which the resin back door 10 is closed. Thus, the open portion 12A is formed at the upper panel 14 and the open portion 12B is formed at the lower panel 16.

Furthermore, the back door panel 12 has an inner panel 20 and an outer panel 30 that configure (form) a closed cross-sectional shape (a chamber) as a result of being joined to one another. The inner panel 20 and the outer panel 30 are each molded using fiber-reinforced plastic (FRP) such as, for example, carbon fiber-reinforced plastic (CFRP).

As shown in FIG. 1 and FIG. 2, the inner panel 20 on the upper panel 14 side has a front edge portion 22 that extends in the vehicle width direction on the vehicle body front side and configures the open portion 12A, right and left edge portions 24 that extend in the vehicle body front-rear direction on the vehicle width direction outer sides and configure the open portion 12A, and a rear edge portion 26 that extends in the vehicle width direction on the vehicle body rear side and configures the open portion 12A.

It should be noted that the inner panel 20 on the lower panel 16 side serves as a bottom portion 28 formed in a substantially flat plate shape, and the open portion 12B is formed at the upper portion of the bottom portion 28 (on the lower side of the rear edge portion 26). Consequently, the bottom portion 28 is disposed integrally and continuously from the vehicle width direction outside end portions of the rear edge portion 26 toward the vehicle body lower side.

The outer panel 30 has a front portion outer panel 32 that extends in the vehicle width direction and configures a closed cross-sectional shape (chamber) with the front edge portion 22, right and left side portion outer panels 34 that extend in the vehicle body front-rear direction and configure closed cross-sectional shapes (chambers) with the right and left edge portions 24, and a rear portion outer panel 36 that configures a closed cross-sectional shape (chamber) with the bottom portion 28.

It should be noted that projecting portions 38, which have bilaterally symmetrical shapes and are formed in substantially flat plate shapes that project in the vehicle body frontward and upward direction (vehicle body front-rear direction) along the inner panel 20, are integrally formed on the vehicle width direction outside upper end portions of the rear portion outer panel 36. The projecting portions 38 configure closed cross-sectional shapes (chambers) with the vehicle width direction outside end portions of the rear edge portion 26 as described later (see FIG. 6).

Figure 3:
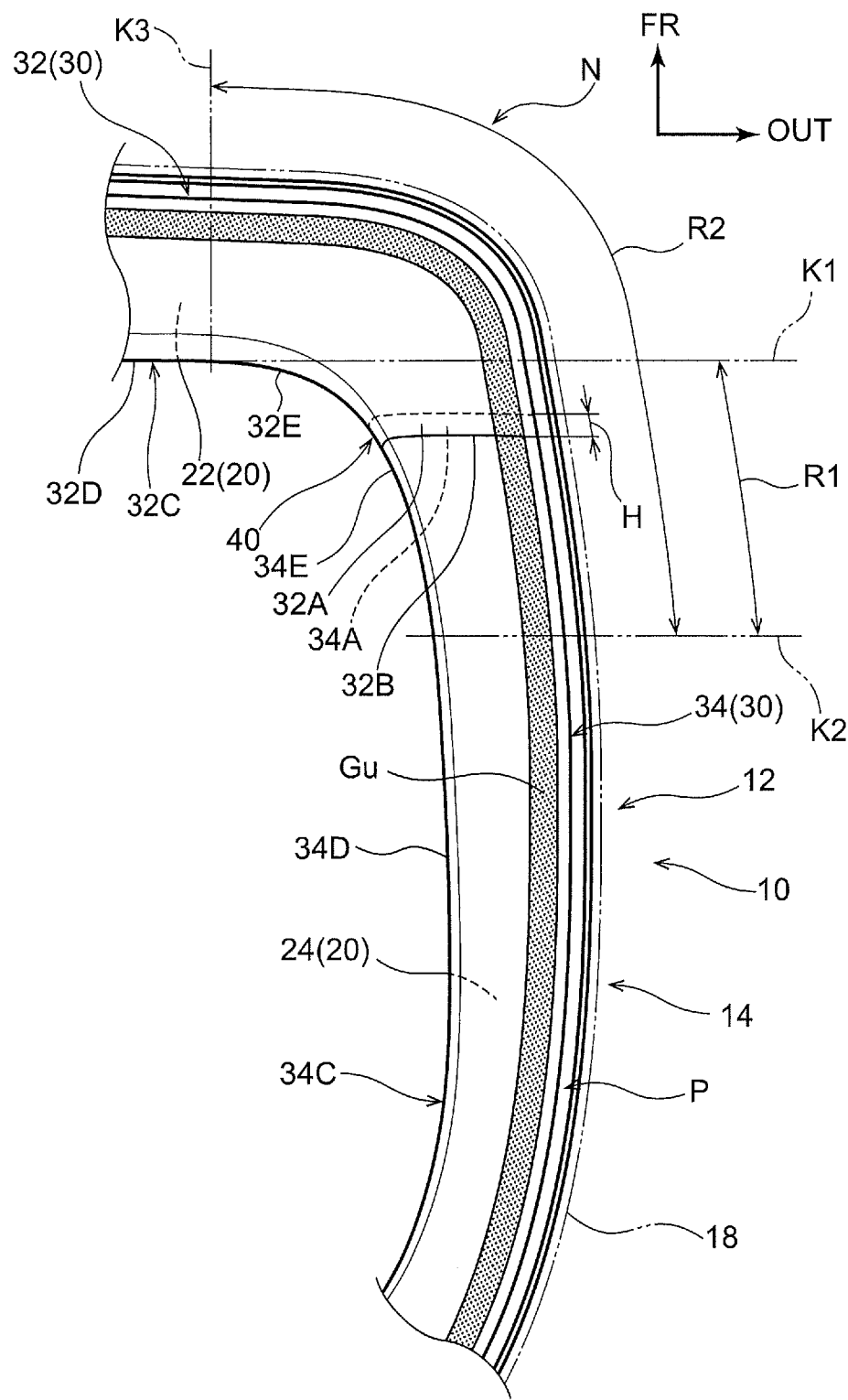
FIG. 3 is an enlarged plan view showing a corner portion on a front portion side of the back door panel that configures the vehicular resin back door pertaining to the FIG. 1 embodiment.

Furthermore, as shown in FIG. 3, right and left end portions 32A (vehicle width direction outside end portions) of the front portion outer panel 32 are curved toward the vehicle body rear side as seen in a plan view, and end surfaces 32B thereof lie along the vehicle width direction. Additionally, the right and left end portions 32A of the front portion outer panel 32 are overlaid a predetermined width H (e.g., H=15 mm) or more from above on, and are joined by a high-rigidity structural adhesive G (see FIG. 4) to, front end portions 34A of the side portion outer panels 34 (hereinafter these sites will be called "front joint portions 40").

Figure 4:
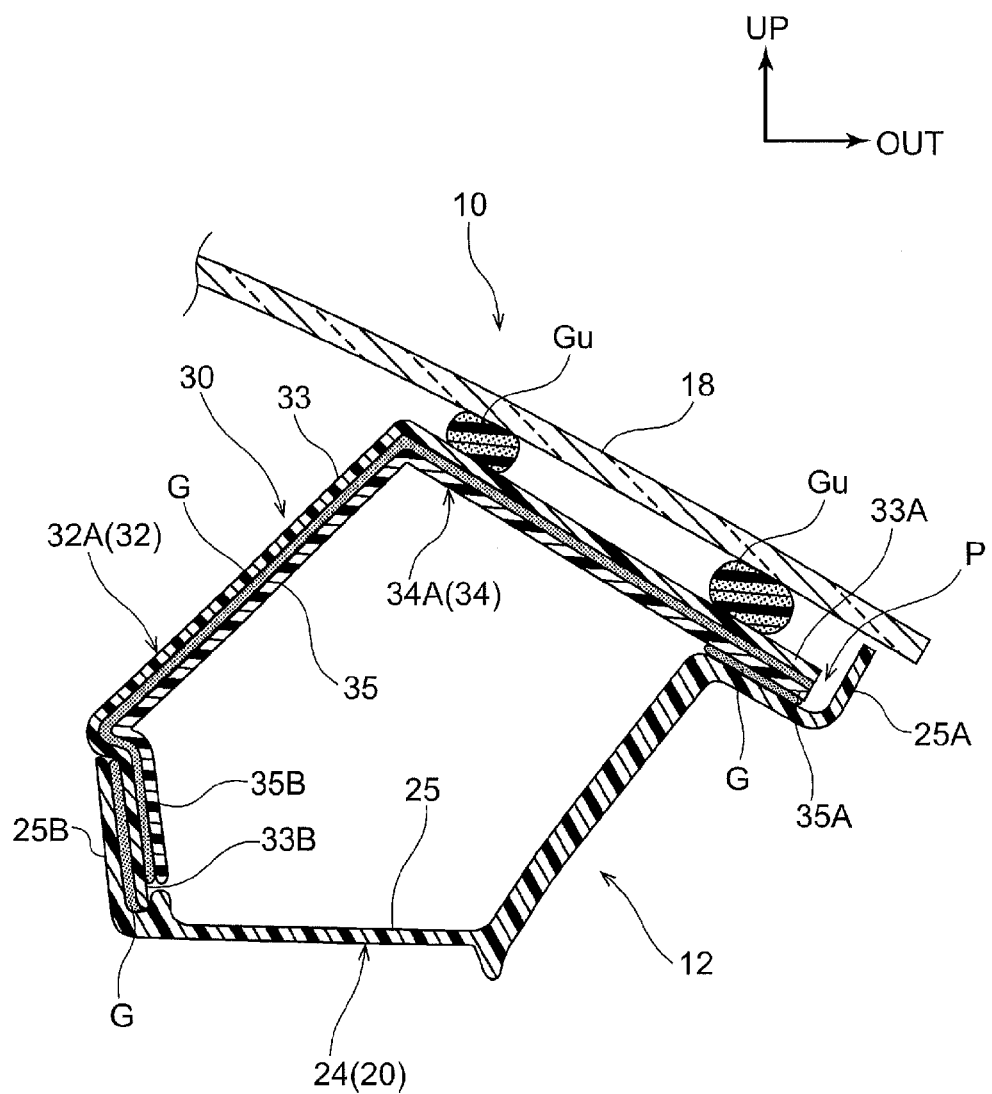
FIG. 4 is a cross-sectional view, as seen from line X-X of FIG. 2, of the vehicular resin back door pertaining to the FIG. 1 embodiment.

Specifically, as shown in FIG. 4, the side portion outer panels 34 (including the front end portions 34A) each have an outer panel main body 35 that is formed in a cross-sectionally substantial inverted "L" shape and extends in the vehicle body frontward and upward direction (vehicle body front-rear direction), an outer flange portion 35A that is formed on the vehicle width direction outside end portion of the outer panel main body 35, and an inner flange portion 35B that is formed as a result of the vehicle width direction inside end portion of the outer panel main body 35 being bent toward the vehicle body lower side.

Additionally, the right and left end portions 32A of the front portion outer panel 32 each have an outer panel main body 33 that is formed in the same cross-sectionally substantial inverted "L" shape as the outer panel main body 35 and extends in the vehicle body frontward and upward direction (vehicle body front-rear direction), an outer flange portion 33A that is formed on the vehicle width direction outside end portion of the outer panel main body 33, and an inner flange portion 33B that is formed as a result of the vehicle width direction inside end portion of the outer panel main body 33 being bent toward the vehicle body lower side.

Consequently, the adhesive G is applied to the upper surfaces of the outer panel main bodies 35 of the front end portions 34A of the side portion outer panels 34 and to the upper surfaces of the outer flange portions 35A and the inner flange portions 35B, and the lower surfaces of the outer panel main bodies 33 of the right and left end portions 32A of the front portion outer panel 32 and the lower surfaces of the outer flange portions 33A and the inner flange portions 33B are overlaid from above on and are joined at three surfaces to the adhesive G. Because of this, the rigidity of the front joint portions 40 is improved.

The right and left edge portions 24 of the inner panel 20 each have an inner panel main body 25 that is formed in a cross-sectionally substantial "L" shape and extend in the vehicle body frontward and upward direction (vehicle body front-rear direction), an outer flange portion 25A that is formed as a result of the vehicle width direction outside end portion of the inner panel main body 25 being bent outward in the vehicle width direction and then being bent toward the vehicle body upper side, and an inner flange portion 25B that is formed as a result of the vehicle width direction inside end portion of the inner panel main body 25 being bent toward the vehicle body upper side.

Thus, closed cross-sectional shapes (chambers) are formed at both the right and left side portions of the back door panel 12 as a result of the outer flange portions 35A of the outer panel 30 being overlaid from above on, and joined by the adhesive G to, the outer flange portions 25A of the inner panel 20 and the inner flange portions 33B of the outer panel 30 being overlaid from inside (inside the chambers) on, and joined by the adhesive G to, the inner flange portions 25B of the inner panel 20.

Figure 5:
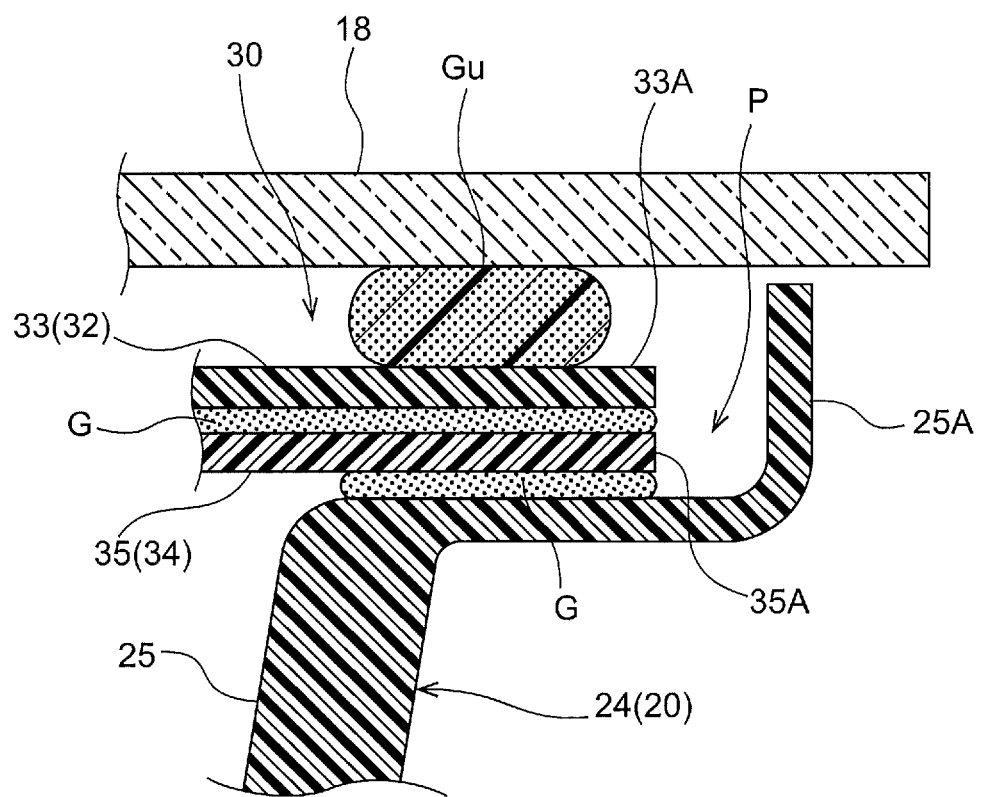
FIG. 5 is a partial enlarged cross-sectional view of FIG. 4.

It should be noted that, as shown in FIG. 3 and FIG. 4, the back window upper glass 18 is joined by a urethane adhesive Gu to the upper surfaces of the outer flange portions 33A of the outer panel 30 and the upper surfaces of the outer panel main bodies 33 (in FIG. 3, the urethane adhesive Gu on the upper surface side of the outer panel main bodies 33 is not shown). Furthermore, as shown in FIG. 5, a U-shaped groove-like channel P for draining rainwater or the like is formed between the vehicle width direction outside end portions of the outer flange portions 33A and 35A of the outer panel 30 and the outer flange portions 25A of the inner panel 20 (the outer peripheral edge portion of the back door panel 12).

Furthermore, as shown in FIG. 3, an inner peripheral edge portion 32C of the front portion outer panel 32 and an inner peripheral edge portion 34C of each of the side portion outer panels 34 are continuous with one another via a curved section. More specifically, a curved portion 32E, which is arc-shaped as seen in a plan view and continues from a linear portion 32D along the vehicle width direction at the inner peripheral edge portion 32C, and a curved portion 34E, which is arc-shaped as seen in a plan view and continues from a linear portion 34D along the vehicle body front-rear direction at the inner peripheral edge portion 34C, are continuous with one another via the front joint portion 40.

Additionally, each of the right and left end portions 32A of the front portion outer panel 32 extends in such a way as to exist in a region R1 on the vehicle body rear side of a hypothetical extension line K1 of the linear portion 32D of the inner peripheral edge portion 32C extending outward in the vehicle width direction and on the vehicle body front side of a hypothetical straight line K2 along the vehicle width direction passing through the boundary between the linear portion 34D and the curved portion 34E of the inner peripheral edge portion 34C of the side portion outer panel 34.

Furthermore, a region R2 between the hypothetical straight line K2 and a hypothetical straight line K3 along the vehicle body front-rear direction passing through the boundary between the linear portion 32D and the curved portion 32E of the inner peripheral edge portion 32C of the front portion outer panel 32 is a corner portion N on the front portion side of the back door panel 12 and is a corner portion as seen in a plan view. Additionally, the region R1 is included in the region R2 that defines the corner portion N.

Figure 6:
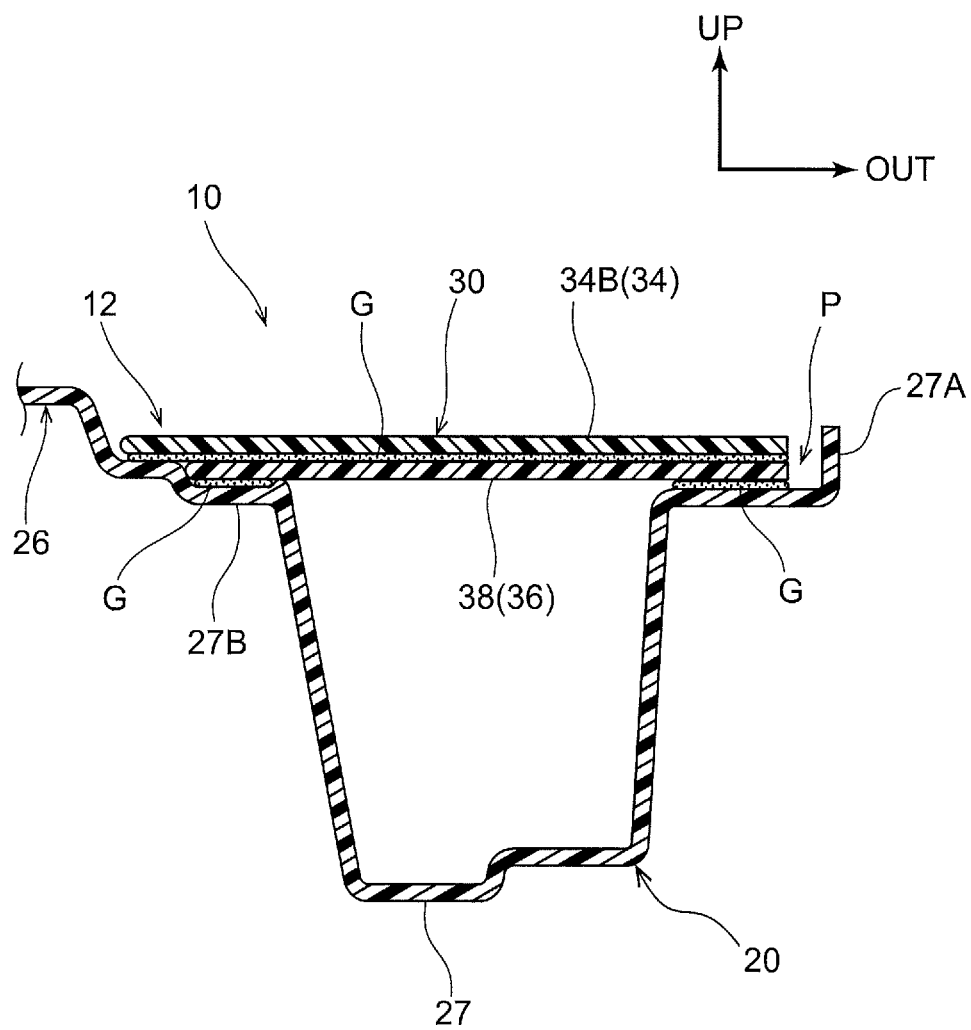
FIG. 6 is a cross-sectional view, as seen from line Y-Y of FIG. 2, of the vehicular resin back door pertaining to the FIG. 1 embodiment.

Furthermore, as shown in FIG. 1 and FIG. 2, substantially flat plate-shaped rear end portions 34B of the side portion outer panels 34 are overlaid a predetermined width or more from above on, and are joined by the adhesive G to, the right and left projecting portions 38 of the rear portion outer panel 36 (hereinafter these sites will be called "rear joint portions 42"). Specifically, as shown in FIG. 6, the adhesive G is applied to the upper surfaces of the projecting portions 38 of the rear portion outer panel 36, and the lower surfaces of the rear end portions 34B of the side portion outer panels 34 are overlaid from above on and are joined to the adhesive G.

Each of the vehicle width direction outside end portions of the rear edge portion 26 of the inner panel 20 has an inner panel main body 27, which is formed in a cross-sectionally substantial "U" shape, and an outer flange portion 27A, which is formed as a result of the vehicle width direction outside end portion of the inner panel main body 27 being bent outward in the vehicle width direction and then being bent toward the vehicle body upper side. The vehicle width direction inside end portion of the inner panel main body 27 is an inner flange portion 27B that is continuous with the rear edge portion 26.

Consequently, closed cross-sectional shapes (chambers) are formed at the vehicle width direction outside end portions of the rear edge portion 26 of the inner panel 20—in other words, in the rear sides of the right and left side portions of the back door panel 12—as a result of the vehicle width direction outside end portions of the projecting portions 38 being overlaid from above on, and joined by the adhesive G to, the outer flange portions 27A of the inner panel 20 and the vehicle width direction inside end portions of the projecting portions 38 being overlaid from above on, and joined by the adhesive G to, the inner flange portions 27B of the inner panel 20.

It should be noted that the channel P is formed between the outer flange portions 27A and the vehicle width direction outside end portions of the rear end portions 34B and the projecting portions 38 (the outer peripheral edge portion of the back door panel 12). Furthermore, as shown in FIG. 2, the rear joint portions 42 at which the vehicle width direction outside end portions of the rear edge portion 26 of the inner panel 20, the rear end portions 34B of the side portion outer panels 34, and the projecting portions 38 of the rear portion outer panel 36 are joined to one another are trifurcated portions T of the back door panel 12 and are corner portions as seen in a side view. Furthermore, end surfaces 34F of the rear end portions 34B of the side portion outer panels 34 at the trifurcated portions T (corner portions) lie along the vehicle width direction.

Next, the action of the vehicular resin back door 10 having the above configuration will be described.

In the corner portions N (the regions R2, and more specifically the regions R1) of the back door panel 12, the right and left end portions 32A of the front portion outer panel 32 are overlaid from above on, and are joined by the adhesive G (at the three surfaces) to, the front end portions 34A of the side portion outer panels 34. Consequently, the torsional rigidity of the corner portions (the corner portions N) on the front portion side of the back door panel 12 can be improved without having to add separate reinforcement members.

Moreover, the right and left end portions 32A of the front portion outer panel 32 are curved toward the vehicle body rear side as seen in a plan view and are overlaid from above on and are joined to the front end portions 34A of the side portion outer panels 34. In other words, the front joint portions 40 are disposed in the regions R1 that are part of the corner portions N (the regions R2). Additionally, the end surfaces 32B of the right and left end portions 32A of the front portion outer panel 32 lie along the vehicle width direction.

Figure 7A:
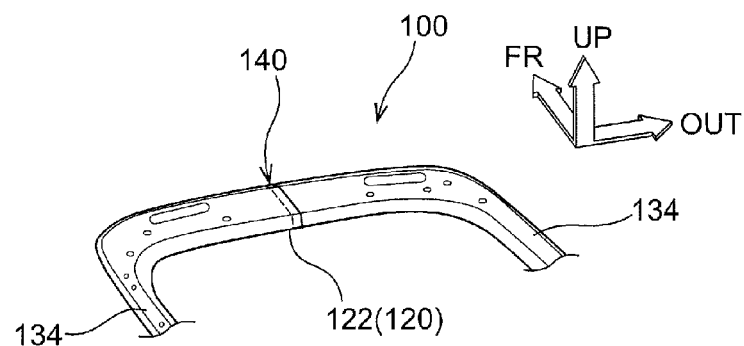
FIG. 7A is a perspective view showing a front portion side of a vehicular resin back door pertaining to a comparative example.

Thus, the waterproofness of the corner portions N (corner portions) of the back door panel 12 can be improved. More specifically, for example, in a resin back door 100 pertaining to a comparative example shown in FIG. 7A, a right and left pair of side outer panels 134 configure right and left halves each of a front portion outer panel and are joined to one another in a vehicle width direction central portion of a front edge portion 122 of an inner panel 120.

Figure 7B:
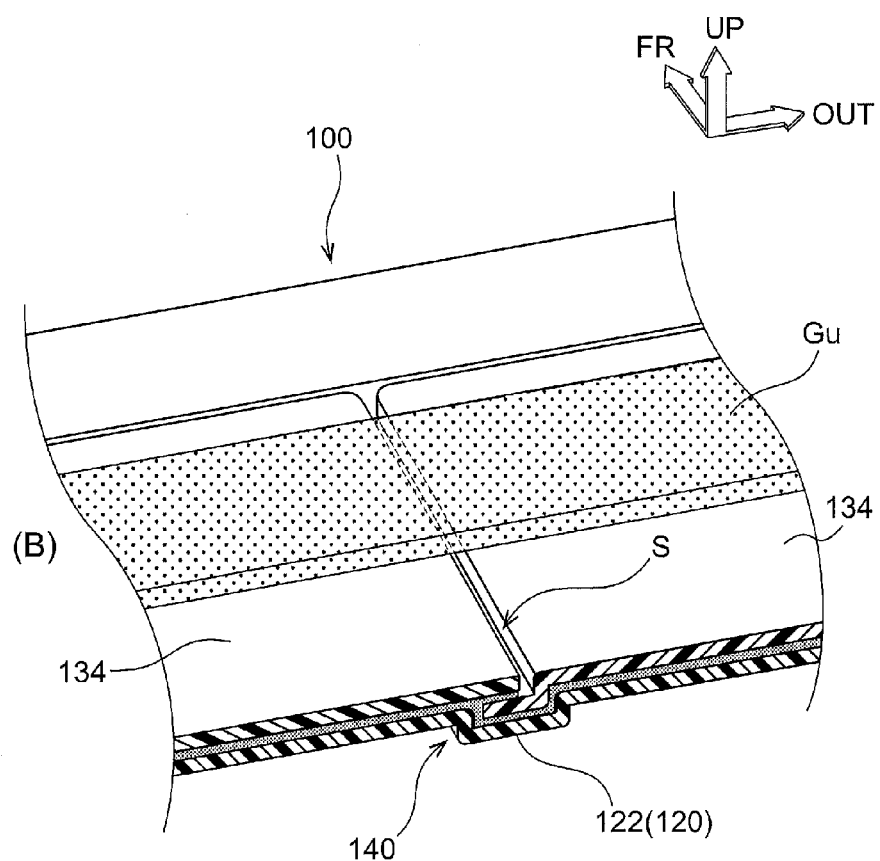
FIG. 7B is an enlarged perspective view showing, by way of a cross section, part of FIG. 7A.

Consequently, in this case, as shown in FIG. 7B, a space S along the vehicle body front-rear direction (along the direction in which rainwater or the like flows) ends up being fondled over a front joint portion 140 of the side portion outer panels 134, and there is the concern that rainwater or the like will enter from this space S. Furthermore, in order to ensure that rainwater or the like does not enter from the space S, a work process such as filling the space S with urethane adhesive Gu ends up becoming necessary.

In contrast, the front joint portions 40 in the present embodiment are formed over the right and left edge portions 24 (in the regions R1) of the inner panel 20, and the end surfaces 32B of the right and left end portions 32A of the front portion outer panel 32 lie along the vehicle width direction (lie in a direction orthogonal to the direction in which rainwater or the like flows). Additionally, the channel P for draining rainwater or the like is formed at the outer peripheral edge portion of the back door panel 12.

Consequently, even if spaces along the vehicle width direction end up being formed over the front joint portions 40, there is no concern that rainwater or the like will enter from those spaces. In other words, according to the back door panel 12 pertaining to the present embodiment, rainwater or the like is deterred or prevented from entering from spaces in the front joint portions 40. Additionally, a work process for filling those spaces can also be rendered unnecessary.

It should be noted that the same is also true with respect to the trifurcated portions T (corner portions) of the back door panel 12. That is, in the trifurcated portions T of the back door panel 12, the rear end portions 34B of the side portion outer panels 34 are overlaid from above on, and are joined by the adhesive G to, the projecting portions 38 of the rear portion outer panel 36. Consequently, the torsional rigidity of the corner portions (the trifurcated portions T) on the rear portion side of the back door panel 12 can be improved.

Additionally, the end surfaces 34F of the side portion outer panels 34 at the trifurcated portions T of the back door panel 12 lie along the vehicle width direction, and the channel P for draining rainwater or the like is formed at the outer peripheral edge portion of the back door panel 12. Thus, the waterproofness can be improved at the trifurcated portions T (corner portions) (rainwater or the like can be deterred or prevented from entering from spaces in the rear joint portions 42).

The vehicular resin back door 10 pertaining to the present embodiment has been described above on the basis of the drawings, but the vehicular resin back door 10 pertaining to the present embodiment is not limited to what is shown in the drawings and can appropriately undergo design changes. For example, the inner panel 20 and the outer panel 30 are not limited to a configuration where they are each molded using fiber-reinforced plastic (FRP).

Furthermore, it suffices for the positions of the front joint portions 40 at which the right and left end portions 32A of the front portion outer panel 32 and the front end portions 34A of the side portion outer panels 34 are overlaid on and are joined to one another to be in the regions R2 from the standpoint of improving the torsional rigidity of the corner portions N (corner portions), but it is preferable for them to be in the regions R1 from the standpoint of improving the waterproofness of the back door panel 12.

Furthermore, as long as the waterproofness of the back door panel 12 can be well ensured, the right and left end portions 32A of the front portion outer panel 32 and the rear end portions 34B of the side portion outer panels 34 do not have to be overlaid from above on one another. Additionally, the end surfaces 32B of the right and left end portions 32A of the front portion outer panel 32 and the end surfaces 34F of the rear end portions 34B of the side portion outer panels 34 do not have to lie along the vehicle width direction.

What is claimed is:

1. A vehicular resin back door comprising:
   (a) an inner panel made of resin, the inner panel including:
      a front edge portion that extends in a vehicle width direction, and
      right and left edge portions that extend from the front edge portion in a vehicle body front-rear direction, the front, right and left edge portions configuring an opening;
   (b) a front portion outer panel that extends in the vehicle width direction and is attached to the front edge portion of the inner panel to form a first chamber;
   (c) a right side portion outer panel and a left side portion outer panel that each extend in the vehicle body front-rear direction and are respectively attached to the right and left edge portions of the inner panel to form second chambers; and
   (d) front joint portions at which vehicle width direction outside end portions of the front portion outer panel and front end portions of the side portion outer panels overlap and are joined to one another.

2. The vehicular resin back door according to claim 1, wherein the vehicle width direction outside end portions of the front portion outer panel are curved toward a vehicle body rear side as seen in a plan view, and overlap from a vehicle body upper side, and are joined to, the front end portions of the side portion outer panels.

3. The vehicular resin back door according to claim 2, wherein end surfaces of the vehicle width direction outside end portions of the front portion outer panel extend along the vehicle width direction.

4. The vehicular resin back door according to claim 1, wherein
the inner panel further comprises:
a rear edge portion that extends in the vehicle width direction and forms the opening with the front, right and left edge portions of the inner panel, and
a bottom portion that is integrally disposed at the vehicle body lower side of the rear edge portion of the inner panel; and the vehicular resin back door further comprises:
a rear portion outer panel that is attached to the bottom portion of the inner panel to form a third chamber, and
rear joint portions at which vehicle width direction outside upper end portions of the rear portion outer panel and rear end portions of the side portion outer panels overlap and are joined to one another at vehicle width direction outside end portions of the rear edge portion of the inner panel.

5. The vehicular resin back door according to claim 4, wherein the rear end portions of the side portion outer panels overlap from the vehicle body upper side, and are joined to, the vehicle width direction outside upper end portions of the rear portion outer panel.

6. The vehicular resin back door according to claim 5, wherein end surfaces of the rear end portions of the side portion outer panels extend along the vehicle width direction.

* * * * *